US009280680B2

(12) United States Patent
Gibson et al.

(10) Patent No.: US 9,280,680 B2
(45) Date of Patent: Mar. 8, 2016

(54) PHOTOBOOK WITH AUGMENTED SOCIAL CAPABILITY

(71) Applicant: Xerox Corporation, Norwalk, CT (US)

(72) Inventors: George Amos Gibson, Fairport, NY (US); Kerstin M. Henseleit, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 105 days.

(21) Appl. No.: 14/244,109

(22) Filed: Apr. 3, 2014

(65) Prior Publication Data
US 2015/0286832 A1 Oct. 8, 2015

(51) Int. Cl.
*H04L 29/06* (2006.01)
*G06F 21/62* (2013.01)

(52) U.S. Cl.
CPC .......... *G06F 21/6218* (2013.01); *H04L 63/102* (2013.01)

(58) Field of Classification Search
CPC ................ G06F 17/30879; G06F 17/30725
See application file for complete search history.

(56) References Cited

U.S. PATENT DOCUMENTS

| 8,195,133 B2* | 6/2012 | Ramer | G06F 17/30749 455/414.1 |
| 8,271,489 B2 | 9/2012 | Lin et al. | |
| 2005/0210413 A1* | 9/2005 | Quek | G03D 15/005 715/838 |
| 2008/0305795 A1* | 12/2008 | Murakami | H04L 12/1859 455/435.1 |
| 2011/0161076 A1* | 6/2011 | Davis | G06F 3/04842 704/231 |
| 2012/0222055 A1* | 8/2012 | Schaefer | G06Q 20/145 725/5 |
| 2012/0300087 A1* | 11/2012 | Shore | G06Q 30/02 348/207.1 |
| 2012/0330707 A1* | 12/2012 | Loucks | G06Q 10/06 705/7.13 |
| 2013/0166969 A1* | 6/2013 | Zhang | G06F 11/0772 714/57 |
| 2015/0090778 A1* | 4/2015 | Trongone | A47C 1/13 235/375 |

FOREIGN PATENT DOCUMENTS

EP         2393667 A1    12/2011

* cited by examiner

*Primary Examiner* — Mohammad L Rahman
(74) *Attorney, Agent, or Firm* — Fox Rothschild LLP

(57) ABSTRACT

Method and system for providing an augmented photobook that includes at least one interactive feature. An image of a symbology printed on a page of a photobook is captured, and address information contained therein is decoded. A web browser of an electronic device is directed to a website identified by the address information, and additional information related to the photobook is received from a remote computing device associated with the website. The additional information related to the photobook is displayed on the electronic device. Additionally, a level of access to the website is determined for a user of the electronic device. A user request to transmit new content to the website is received it is determined whether the level of access corresponds to permission rights for the website. If the level of access corresponds to the permission rights then the new content is transmitted and aggregated at the website.

19 Claims, 4 Drawing Sheets

PHOTOBOOK WITH AUGMENTED SOCIAL CAPABILITY

BACKGROUND

The present disclosure relates to photobooks. More specifically, the present disclosure relates to incorporating multimedia information with a photobook.

As the adoption of smartphones continues, consumers are increasingly capturing still and video images casually as they live their daily lives. Occasionally, a collection of individuals will capture various unique and distinct moments at an event such as a wedding or other similar gathering. Photos of a single event collected by multiple people are becoming more normal rather than an exception, and collections of those multiple photos are not currently easily organized.

Photobooks are widely used as central collection points for documenting an event. For example, a wedding organizer or other similar figure may ask guests at the wedding to provide copies of any pictures they take during the event. Then, the photos can be collected and organized into a photobook associated with the event. However, once the photobook is printed, there is no easy way to append new information to the photobook short of including electronic memory within the book itself.

SUMMARY

In one general respect, the embodiments disclose a method of providing an augmented photobook that includes at least one interactive feature. The method includes capturing an image of a symbology printed on a page of a photobook, decoding address information contained within the symbology, directing a web browser of the electronic device to a website as identified by the address information, receiving additional information related to the photobook from a remote computing device associated with the website, displaying the additional information related to the photobook, determining a level of access for a user of the electronic device, receiving a user request to transmit new content to the website, and determining, whether the level of access corresponds to permission rights for the user request. If the level of access corresponds to the permission rights, then in response to the user request, the method may further includes transmitting new content from the device to be aggregated at the website.

In another general respect, the embodiments disclose a method of providing information related to a photobook. The method includes receiving a request from a user device to access a website associated with a photobook, determining that the request includes an address for a web page, wherein the address has been encoded on a printed page of the photobook, transmitting a digital representation of the web page to the user device so that the representation includes content associated with the printed page, receiving a user request to submit additional content to the website, wherein the user request includes a level of access associated with the user, and determining whether the level of access associated with the user meets permission rights for uploading additional content. If the level of access associated with the user meets the permission rights for uploading additional content, the method can further include receiving the additional content, aggregating the additional content with existing content contained in the website, and providing access to the additional content to subsequent users that request access to the website.

In another general respect, the embodiments disclose a system providing an augmented photobook that includes at least one interactive feature. The system includes a processing device configured to perform various functions and operations for an electronic device, and a non-transitory computer readable medium in communication with the processing device. The computer readable medium includes one or more programming instructions for causing the processing device to receive an image of a symbology printed on a page of a photobook, decode address information contained within the symbology, direct a web browser of the electronic device to a website as identified by the address information, receive additional information related to the photobook from a remote computing device associated with the website, display the additional information related to the photobook on a display of the electronic device, determine a level of access for a user of the electronic device, receive a user request to transmit new content to the website, and determine whether the level of access corresponds to permission rights for the user request. If the level of access corresponds to the permission rights, then in response to the user request, the processing device can be further instructed to transmit new content from the device to be aggregated at the website.

DETAILED DESCRIPTION

Figure 1:
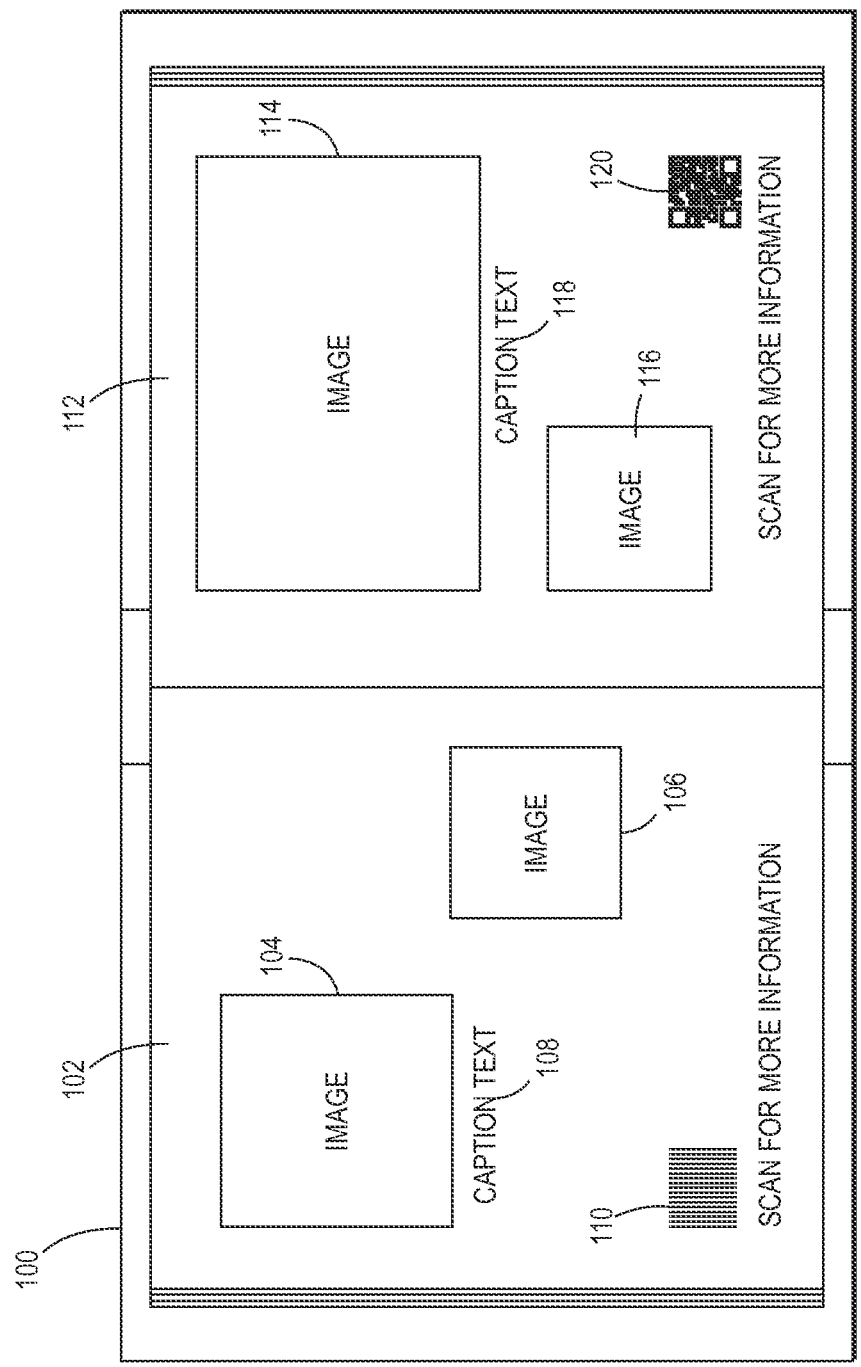
FIG. 1 depicts a sample photobook page view according to an embodiment.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

As used herein, a "computing device" refers to a device that processes data in order to perform one or more functions. A computing device may include any processor-based device such as, for example, a server, a personal computer, a personal digital assistant, a web-enabled phone or smartphone, a smart terminal, a dumb terminal and/or other electronic device capable of communicating in a networked environment. A computing device may interpret and execute instructions.

A "photobook" refers to, for example, a printed and optionally bound collection of pages, the pages including images and text typically related to a specific event, events or topics to which the photobook is directed. Typically a photobook publisher provides an outlet for consumers to add images to a variety of standard and customizable layouts to commemorate personal or professional events or occasions. Typically, when bound by a publishing company, a photobook includes custom covers that marry photo context with a backing board so as to provide mechanical and structural stability to the photobook. Alternatively or additionally, a photobook can include a digital set of data in a form suitable for immediate submission to digital printing hardware, e.g., in a portable document format (PDF) or another similar format, and may or may not include instructions for off-line finishing or other processing.

A "symbology" is a pattern or symbol that that is displayed on a surface and which represents data. Symbologies may include, without limitation, one-dimensional barcodes, two-dimensional (2D) barcodes, or three-dimensional barcodes, and they may be an optical, machine-readable representation of data. Examples of one-dimensional barcodes include Universal Product Code (UPC) symbols and the like. Examples of two-dimensional barcodes include data matrix codes, quick response (QR) codes, Aztec codes, Maxi codes and the like. The symbology may be printed on a substrate or displayed on an electronic display, and may be of any geometric shape or size. In this document, the term "barcode" may be used in the examples, but the term is intended to include any such symbology.

The present disclosure is directed to an augmented photobook that provides a data aggregation and collection process built upon existing photobook techniques. As described above, typical photobooks provide a static repository for information, whether a physical object such as a printed book or a digital object such as a PDF file. While creation of and selection of the photos that make up the photobook may be a collaborative effort amongst multiple people, once the book is created the collaboration ends and the final product can printed and optionally bound, and distributed to various recipients.

Driven by the dropping costs of near-professional and professional quality video capture devices as well as the widespread adoption of smartphones and available wireless data networks such as Wi-Fi, the amount of consumer video that is shot and shared each year is increasing exponentially. Many social media websites have built their entire business model on consumers' desire to share this data. Moreover, as the plethora of photo-sharing websites and services can demonstrate, there is considerable interest and economic activity associated with the sharing of photo, audio and video content among social groups. This most commonly emerges as comment sections associated with the shared content. However, by contrast, the photobook has emerged as a relatively static way of incorporating photo data for display. Attempts have been made to provide photobooks with limited memory that can include multimedia information such as music that plays as the photobook is viewed, but the drawbacks to such approaches is that the audio files are limited in size to the memory included in the photobook, and the information must be stored in the photobook at the time the book was printed.

The present disclosure overcomes the limited static nature of existing photobooks by integrating a social media capability into the photobook via one or more interactive features such as symbologies included within the photobook. Each interactive feature can contain content, such as a web address or instruction set, that when captured by a computing device will direct the computing device to a social networking site, photo sharing, or similar data collection site associated with the photobook. For example, the photobook may include a printed electronically readable bar code (e.g., a QR code) that, upon selection by an appropriate computing device (e.g., the user's smartphone) may direct a browser application or the computing device to a web accessible site where the user can access additional information related to the photobook data associated with the selected code. The web accessible site may also provide the user with the option to upload or add content to the web accessible site, including, but not limited to, additional photographs, commentary, multi-media files, and other similar content. Such an arrangement allows the user or a photobook creator to selectively allow the aggregation of additional materials germane to the photobook's original content, thus building a community of shared interest which can be continually refreshed by additional users. The site may contain some or all of the additional content uploaded by users.

FIG. 1 illustrates an example of a photobook 100 according to an embodiment. AS described above, the photobook 100 may be a physical photobook printed and optionally bound, or the photobook may be a digital file or other similar digital representation made available to one or more users. The photobook 100 may include a plurality of pages, including pages 102 and 112 as shown in FIG. 1. During creation of the photobook 100, a user may have the option to include one or more images on each page (or, for example, a large image may be spread across multiple pages). Similarly, the user may include on or more text captions. Additional features such as background images, embossed or textured patterns, and other similar features may be added to the photobook as well, depending upon the production capabilities of the company or print service that is producing the photobook.

For example, as shown in FIG. 1, page 102 may include multiple images 104, 106 as well as caption text 108. It should be noted that the two images 104, 106 and a single caption text 108 are shown by way of example only, and additional combinations of features may be included on page 102 based upon the preference of the user creating the photobook 100.

Additionally, as taught herein, the photobook 100 page 102 may include an interactive feature. For example, as shown in FIG. 1, the page 102 may include a barcode 110, along with optional instructions such as "Scan for More Information," as shown in FIG. 1.

During creation of the photobook 100, the interactive system the user is accessing to create the photobook may prompt the user with the option to include an interactive feature. Upon receipt of a selection to include an interactive feature, the interactive system may further prompt the user with the option to encode various information within the interactive feature. For example, the user creating the photobook 100 may be prompted to include a web address that will be encoded within the interactive feature. The information encoded into the interactive feature may include a uniform resource locator (URL) or address for a page of a website related to either the overall topic of the photobook 100 (e.g., a specific event), or to a specific subject that is included on that specific page, e.g., page 102. For example, if the photobook 100 is directed to a wedding, page 102 may include pictures of the bride. In this case, the user creating the book may opt to have the interactive feature include a web address for a page associated with the bride's social media account. The web address may be encoded and printed as barcode 110 as shown in FIG. 1. Then, when viewing the photobook 100, a person can select or capture an image of the barcode 110 with an appropriate device (e.g., a smartphone) which is configured to decode the web address from the interactive feature and direct a web browser of the device to the web address.

Once the user's device has accessed the web address, the user may access a page that displays additional information related to the page of the photobook. For example, as noted above, the web address may direct a user to a web page from the bride's social media account related to the wedding. The additional information may include user-uploaded information related to the event (or person) associated with the photobook, such as additional pictures, audio clips, video clips, text comments, and other similar information. Additionally, the system may provide the user accessing the social media site the option to upload additional information to the web page or website associated with the web address. To continue the above example, the system may provide a user with the option to upload additional images of the bride to her social media account.

Various criteria or rules for uploading the additional information may be provided as well. For example, a verification process may be included to ensure that uploaded information is related to the event with which it is being associated. Similarly, the system may receive identification information and verify user who uploaded the information to ensure that the user has proper authority to upload the information.

Additional features related to the user-uploaded information may be provided as well. For example, the system may provide a user viewing the additional information the option to purchase an updated photobook that includes the newly added information. Similarly, if a user uploads a new set of information that includes a newly added interactive feature (e.g., a new barcode including encoded material for a new social media site created after the photobook was published), the system may present the user with the option of buying an updated copy of the photobook including the newly added interactive feature.

Alternatively, a specific application may be created for interacting with the photobook. For example, the application may be configured to capture an image of the interactive feature (e.g., barcode 110), decode the address information contained therein, and automatically launch a portal for accessing or providing additional information related to the photobook. Such an application may be provided by the company producing the photobook for an additional fee, or provided by a third party as an added feature.

As shown in FIG. 1, the second page 112 may include multiple images 114, 116 as well as caption text 118. The photobook 100 page 112 may include an interactive feature as well. For example, as shown in FIG. 1, the page 112 may include a QR code 120, along with optional instructions such as "Scan for More Information," as shown in FIG. 1.

It should be noted that barcode 110 and QR code 120 are shown as the interactive features by way of example only as a sample means for physically incorporating the interactive features into the photobook. However, additional techniques can be used to incorporate the interactive features according to the teachings of the present disclosure. For example, one or more radio-frequency identification (RFID) tags may be included within the photobook. A user's device, e.g., a smartphone, may be configured to read information contained within the RFID tag, such as a web address as described above. Alternatively, a near-field communication (NFC) tag may be used. In this case, a user's device, e.g., a smartphone, may connect to the NFC tag via a short range communication protocol such as Bluetooth® to obtain the information contained within the tag. It should be noted that RFID and NFC tagging is provided by way of example only to illustrate additional techniques for including the interactive features, and additional communication technologies can be used.

To reduce manufacturing costs or expenses, and to improve the reliability of the photobook, the RFID and/or NFC tags may be incorporated such that the assembly of the photobook does not damage the individual tag components. For example, an RFID tag may be embedded into the spine of the photobook when bound. Alternatively, conductive inks can be used when printing the individual pages of the photobook, thereby producing an RFID or NFC circuit that is integrated into the actual page of the photobook without requiring any additional manufacturing or assembly steps. Similarly, directional antennas can be used when using an RFID or NFC circuit such that multiple circuits can be included in a single photobook without potential interference between circuits.

It should also be noted that additional information beyond a web address can be included in the interactive feature. For example, authorization or authentication information may be included as well. Such information may be used by the social media website or portal application to determine what level of access a user has. For example, a user may have the authorization to read and write to the additional data stored within the social media website. However, their authorization may prevent them from editing existing information. In this manner, specific interactive features may be created for individual users.

For example, referring to the wedding photobook as described above, the user creating the photobook may create a unique photobook for the bride and groom. Appearance-wise it may be nearly identical to the photobooks created for the guests of the wedding. However, the interactive feature(s) included in the bride and groom's photobook may include a higher level of authorization than the interactive feature(s) included in the photobook for the guests. Thus, only the bride and groom may have full editing rights when accessing the information contained at the web address encoded in the interactive feature.

In order to verify a user's identity, a system such as a publisher's photobook creation and design system, may uniquely create the interactive features for an individual user such that the interactive features indicate what level of authorization that user has. For example, the bride or groom's interactive features may also have an authorization level encoded there that indicates that the bride and groom have full editing rights. Another group of users, such as family members and immediate friends, may have a level of access rights encoded in their interactive features that allows them to upload additional material to the website or websites that are associated with the photobook, but not to delete or edit previously uploaded information. Similarly, other guests of the wedding that are family or close friends may have access rights encoded in their interactive features that allow them to only view the previously uploaded information website or websites that are associated with the photobook.

Figure 2:
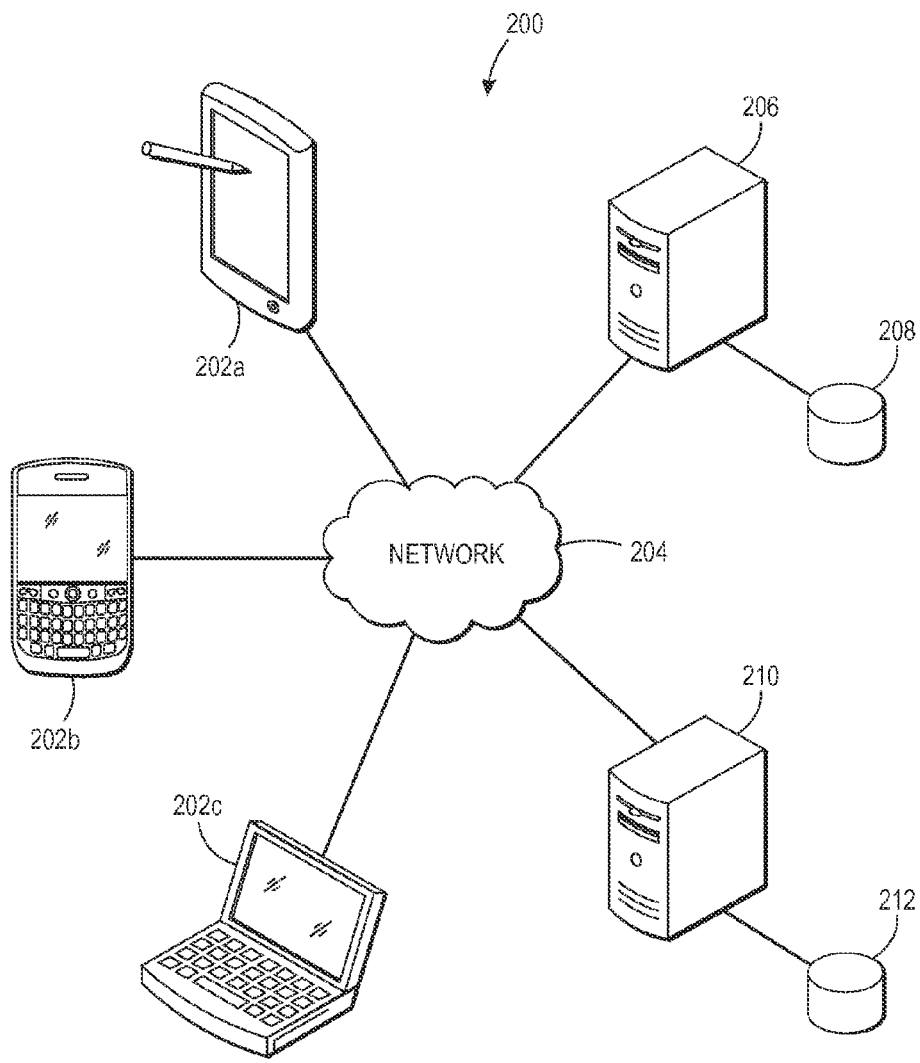
FIG. 2 depicts a network for accessing remote information according to an embodiment.

FIG. 2 illustrates an example of a communications network 200 according to an embodiment. The network 200 may include various user computing devices such as tablet computing device 202a, portable computing device 202b (including, but not limited to smart phones, personal digital assistants, or other portable devices capable of establishing a communications link with a data network), and laptop or notebook computer 202c. The computing devices 202a, 202b, 202c may be accessed by the user in various locations such as at home, at a store, at work, at an airport, or any other similar location. A user may access a browser or similar user interface at one of the computing devices 202a, 202b, 202c to connect to a communications network 204. For example, the user may access the Internet via a wireless network such as a Wi-Fi network or a cellular data network such as a 4G network via the portable computing device 202b.

Additionally, each of the computing devices 202a, 202b and 202c may include an input device, thereby providing the user with a mechanism for accessing the interactive feature (e.g., one or interactive features 110, 120 as shown in FIG. 1). For example, the tablet computing device 202a may include a camera for capturing an image of the interactive feature.

Alternatively, the tablet computing device may include RFID reading capabilities, or NFC capabilities for accessing the interactive feature.

The tablet computing device may further include a software application configured to decode the interactive feature. For example, if the interactive feature is a QR code (e.g., interactive feature 120), the tablet computing device 202a may capture an image of the QR code and decode the interactive feature to determine what, if any, additional information is contained within the QR code. The tablet computing device 202a may transmit the decoded information to a remote server via the communication network 204, and the server may redirect a web browser at the tablet computing device to an appropriate website based upon the interactive feature. For example, the interactive feature may include an address for a social media site hosted on remote computing device 206. The remote computing device 206 may include a computer readable memory device 208 containing various data related to the social media site. Based upon the specific address information contained within the interactive feature, the remote computing device 206 may automatically access additional data related to the interactive feature from the memory device 208.

As described above, a photobook may include multiple interactive features for selection by a viewer of the photobook. In such an example, a viewer may select a second interactive feature with their computing device (e.g., portable computing device 202b), which may direct a web browser operating on the computing device to a website hosted by a second remote computing device 210. The remote computing device 210 may include a computer readable memory device 212 containing various data related to the social media site. Based upon the specific address information contained within the interactive feature, the remote computing device 210 may automatically access additional data related to the interactive feature from the memory device 212.

Additionally, beyond merely providing the user-uploaded information for display on a user device, the photobook system as described herein may also direct targeted advertising for display on the users' devices. For example, the system may provide one or more digital advertisements for display on a user's device, the advertisements including, for example, an option to purchase an updated version of the photobook. Alternatively, the advertising may include advertisements for a photographer or event planner associated with creation of the photobook, or for other third party vendors or businesses. To provide targeted advertising, the system may determine one or more keywords associated with an event represented by either the photobook itself or one or more websites associated with the photobook. For example, each interactive feature may include encoded information related to a topic of the photobook such as a wedding. If the system determines that the photobook or associated website is related to a wedding, the system may provide digital advertisements related to wedding photographers, videographers, bands, florists, and other similar vendors commonly used in wedding, the advertisements being transmitted for display on the user's device.

Figure 3:
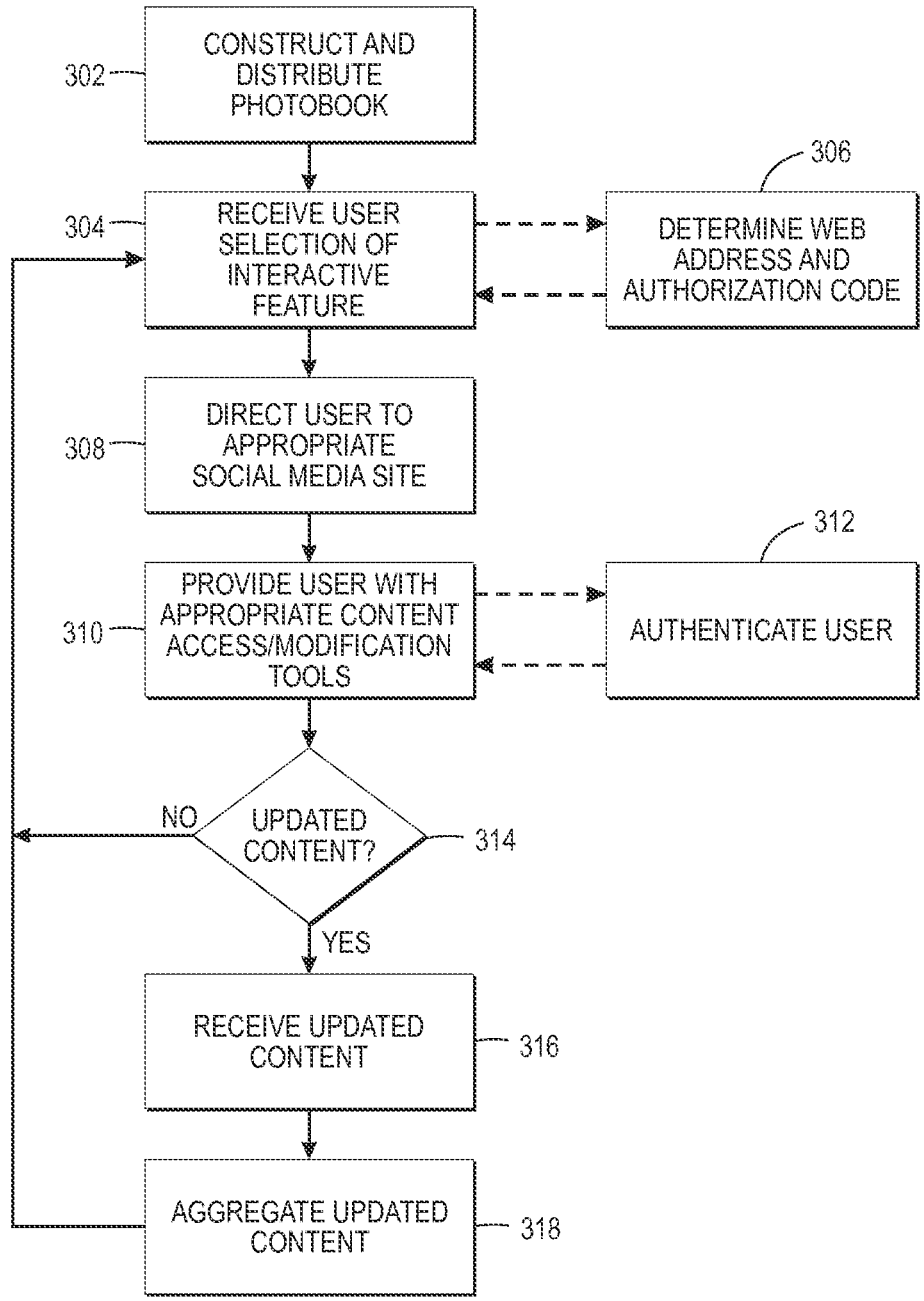
FIG. 3 depicts a sample flow diagram for a process of establishing and utilizing an augmented photobook according to an embodiment.

FIG. 3 illustrates a sample process for accessing the additional information associated with a photobook according to an embodiment. Similar to the process as described above, a photobook is constructed and distributed 302. For example, a person such as a bridesmaid or groomsman may construct a photobook related to a wedding, and distribute 302 the photobook to a group of people associated with the wedding (e.g., the bridal party or all invited guests). As described above, the photobook can include one or more interactive features that include encoded information related to a social media website associated with the photobook. While multiple interactive features may be associated with a single photobook, selection of a single interactive feature is described herein by way of example. However, the process and techniques as described below is applicable to a photobook having multiple interactive features.

Once the book is distributed 302 to the various recipients, a user viewing the photobook may use a portable electronic device and a symbology contained within the photobook to access the social media website, and therefore the additional information, associated with the photobook. A computing device associated used by the user (e.g., the user's smartphone) may receive 304 a user selection of the interactive feature. As described above, the user may launch a portal application on their computing device, and capture an image of the interactive feature. Alternatively, the user's computing device may capture information contained within an RFID or NFC tag.

The user's computing device may determine 306 a web address and authorization code that is encoded in the interactive feature. For example, the computing device may decode the information contained within the interactive feature using a standard decryption algorithm. The web address may be configured such that it includes the address of a specific website or collection of information related to the photobook. Additionally, the authorization code may include an indication of what level of access the viewer is permitted, e.g., can the viewer write additional information or edit existing information.

Based upon the web address, the computing device may direct 308 a web browser being accessed by the user to an appropriate social media website. For example, the computing device may establish a connection with a remote computing device that hosts the social media website, and the remote computing device may provide the viewer with additional information. Additionally, based upon the authorization code contained within the interactive feature, the remote computing device may provide 310 a user with appropriate content access and/or modification tools.

For example, the remote computing device may authenticate 312 the user based upon the authorization code, and determine what access level the user has to the additional information stored at the remote computing device (or a storage medium associated with the remote computing device). Based upon the authentication 312, the system may provide varying levels of access to a particular user. For example, as described above, the system may authenticate one or more users, and determined those users to have full access rights to the additional information. The system may further authenticate a second set of users to have a lower level of access rights and provide those users with the ability to add additional information but not edit or delete existing information. Similarly, the system may further authenticate a third set of users to have the lowest level of access rights and provide those users with the ability to view the uploaded information, but not upload any additional information.

For example, based upon the authorization code, the remote computing device may authenticate 312 the user as having full read/write access. Thus, based upon the user's access level, the system may permit the user to view some or all of the existing additional information, write to the some or all of additional information (e.g., upload additional pictures, videos and other content), and/or edit some or all of the existing additional information.

Alternatively, the remote computing device may authenticate 312 the user and determine that the user only has access to view the content, or that the user has the ability to view and upload new content, but not edit existing content. After authentication 312, the remote computing device may display the additional information, or a combination of the additional information as well as the original photobook content.

As the user views the additional information related to the photobook, the remote computing device may determine 314 whether the user has any updated content to upload to the remote computing device. For example, the remote computing device may receive a transmission indication from the user's computing device that the user is uploading (or intends to upload) updated content.

If the remote computing device does determine 314 that the user has updated content to include with the additional information related to the photobook, the remote computing device may authenticate the user to determine that the user has the appropriate rights to upload the information. If the user is authenticated and authorized to upload the information, the remote computing device may receive 316 the updated content from the user's computing device, and aggregate 318 the updated content into the collection of additional information associated with the photobook. The remote computing device may query the user uploading the information to determine where in the additional content the uploaded content is to be placed. For example, the device may determine whether there is a specific page or interactive feature within the photobook with which the uploaded content is to be associated. Thus, when additional people access the social media site via the interactive feature contained within the photobook, they have access to the updated content as provided by the previous user. Accordingly, when a subsequent user accesses the interactive feature, the system will direct that user's device to the appropriate web page that includes the newly added material.

Alternatively, if the remote computing device does not determine 314 that the user has updated information to include, or if the user does not have an appropriate level of access to provide updated information, the collection of additional information remains unchanged, and additional users will access the same collection of additional information as the previous user.

Such an arrangement as that described above in regard to FIGS. 1-3 provides for a content aggregation system where users can continually update information related to a specific photobook. For example, a high school may include an interactive feature with its yearbook, allowing students to access one or more social media sites associated with the yearbook to provide additional information such as videos and comments. Thus, a traditionally static collection of artifacts such as a yearbook becomes a dynamic collection of information that can be continually accessed and updated into the future.

Figure 4:
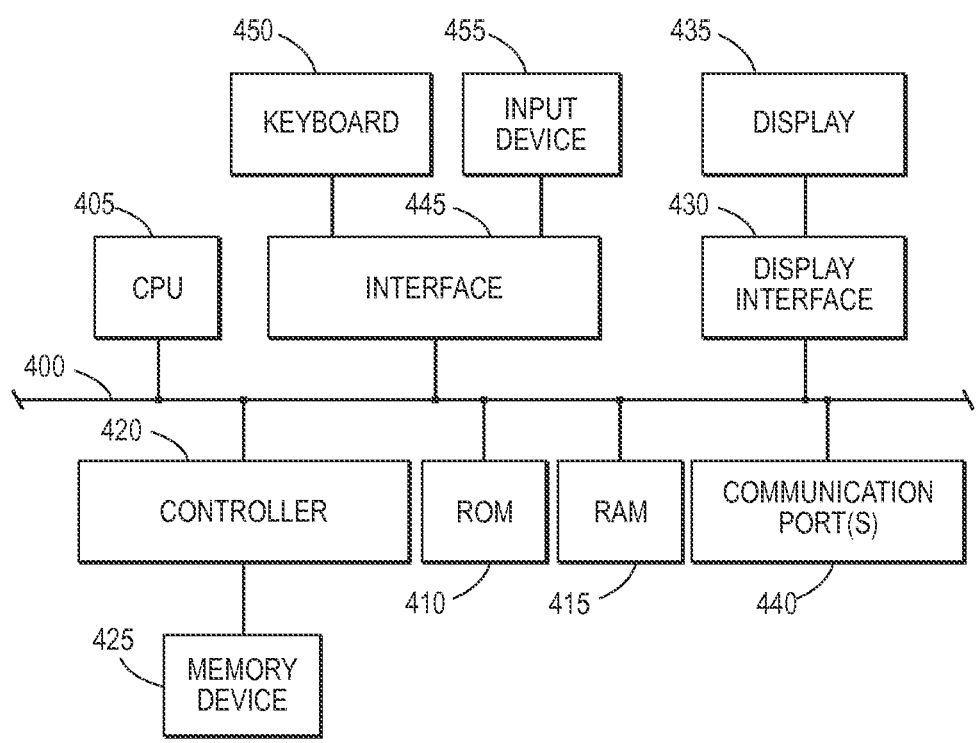
FIG. 4 depicts various embodiments of a computing device for implementing the various methods and processes described herein.

FIG. 4 depicts a block diagram of internal hardware that may be used to contain or implement the various methods and processes as discussed above. An electrical bus 400 serves as the main information highway interconnecting the other illustrated components of the hardware. CPU 405 is the central processing unit of the system, representing a processor (which may be a single processor or any number of processors) performing calculations and logic operations required to execute a program. For example, CPU 405 may perform the one or more functions performed by the processing devices as described in the above discussion of FIG. 3. CPU 405, alone or in conjunction with one or more of the other elements disclosed in FIG. 4, is a processing device, computing device or processor as such terms are used within this disclosure. Read only memory (ROM) 410 and random access memory (RAM) 415 constitute examples of memory devices.

A controller 420 interfaces with one or more optional memory devices 425 to the system bus 400. These memory devices 425 may include, for example, an external or internal DVD drive, a CD ROM drive, a hard drive, flash memory, a USB drive or the like. As indicated previously, these various drives and controllers are optional devices. Additionally, the memory devices 425 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 410 and/or the RAM 415. Optionally, the program instructions may be stored on a tangible computer readable medium such as a compact disk, a digital disk, flash memory, a memory card, a USB drive, an optical disc storage medium, a distributed storage medium such as cloud-based storage architectures, and/or other recording medium.

An optional display interface 430 may permit information from the bus 400 to be displayed on the display 435 in audio, visual, graphic or alphanumeric format. Communication with external devices may occur using various communication ports 440. A communication port 440 may be attached to a communications network, such as the Internet or a local area network.

The hardware may also include an interface 445 which allows for receipt of data from input devices such as a keyboard 450 or other input device 455 such as a mouse, a joystick, a touch screen, a remote control, a pointing device, a video input device and/or an audio input device.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method of providing an augmented photobook, the augmented photobook comprising at least one interactive feature, the method comprising:
   capturing, by an image capturing sensor of an electronic device, an image of a symbology printed on a selected page of a photobook having a plurality of pages;
   decoding, by a processor of the electronic device, address information contained within the symbology;
   directing, by the processor, a web browser of the electronic device to a website as identified by the address information;
   receiving, by the processor, additional information related to the selected page of the photobook from a remote computing device associated with the website;
   displaying, by the processor, the additional information related to the selected page of the photobook;
   determining, by a processor, a level of access for a user of the electronic device;
   receiving, by a processor, a user request to transmit new content to the website;
   determining, by a processor, whether the level of access corresponds to permission rights for the user request; and
   if the level of access corresponds to the permission rights, then in response to the user request, transmitting new content from the device to be aggregated at the website.

2. The method of claim 1, wherein determining a level of access for a user viewing the additional information comprises:
   determining authorization information for a user based upon the symbology; and
   transmitting the authorization information to the remote computing device.

3. The method of claim 2, wherein determining a level of access for a user viewing the additional information further comprises:
   receiving an indication of a level of access the user has to the additional information based upon the transmitted authorization information; and
   providing appropriate access to the additional information based upon the indicated level of access as compared to the permission rights.

4. The method of claim 3, wherein appropriate access comprises at least one of viewing the additional information, adding to the additional information, removing at least a portion of the additional information, and editing at least a portion of the additional information.

5. The method of claim 1, wherein the at least one symbology comprises at least one of a text string, a barcode, a quick response code, a radio-frequency identification tag, and a near-field communication tag.

6. The method of claim 1, further comprising receiving targeted advertising and displaying the targeted advertising on the electronic device.

7. A method of providing information related to a photobook, the method comprising:
   receiving, at a processor of a remote computing device, a request from a user device to access a website associated with a photobook having a plurality of printed pages;
   determining, by the processor, that the request includes an address for a web page, wherein the address has been encoded on a selected printed page of the photobook;
   transmitting, by the processor, a digital representation of the web page to the user device so that the representation includes content associated with the selected printed page;
   receiving, by a processor, a user request to submit additional content to the website, wherein the user request includes a level of access associated with the user;
   determining, by a processor, whether the level of access associated with the user meets permission rights for uploading additional content; and
   if the level of access associated with the user meets the permission rights for uploading additional content:
      receiving the additional content,
      aggregating the additional content with existing content contained in the website, and
      providing access to the additional content to subsequent users that request access to the website.

8. The method of claim 7, wherein the remote computing device is configured to host a social media website.

9. The method of claim 7, wherein the remote computing device is configured to host a website associated with a publisher of the photobook.

10. The method of claim 7, wherein whether the level of access associated with the user meets permission rights for uploading additional content further comprises:
   receiving, by a processor, an indication of the level of access the user has to additional information associated with the photobook; and
   transmitting, by a processor, appropriate access to upload the additional content based upon the indicated level of access as compared to the permission rights.

11. The method of claim 10, wherein permission rights comprise at least one of permission rights to view the additional information, permission rights to add to the additional information, permission rights to remove at least a portion of the additional information, and permission rights to edit at least a portion of the additional information.

12. The method of claim 7, further comprising providing targeted advertising to the user device.

13. The method of claim 12, wherein providing targeted advertising further comprises:
   determining a topic associated with the photobook or the web page;
   determining one or more targeted advertisements based upon the topic; and
   transmitting a digital representation of the one or more targeted advertisements to the user device.

14. A system providing an augmented photobook, the augmented photobook comprising at least one interactive feature, the system comprising:
   a processing device configured to perform various functions and operations for an electronic device; and
   a non-transitory computer readable medium in communication with the processing device, the computer readable medium comprising one or more programming instructions for causing the processing device to:
      receive an image of a symbology printed on a selected page of a photobook having a plurality of pages,
      decode address information contained within the symbology,
      direct a web browser of the electronic device to a website as identified by the address information,
      receive additional information related to the selected page of the photobook from a remote computing device associated with the website,
      display the additional information related to the selected page of the photobook on a display of the electronic device,
      determine a level of access for a user of the electronic device,
      receive a user request to transmit new content to the website,
      determine whether the level of access corresponds to permission rights for the user request, and
      if the level of access corresponds to the permission rights, then in response to the user request, transmit new content from the device to be aggregated at the website.

15. The system of claim 14, wherein the one or more instructions for causing the processing device to determine a level of access for a user viewing the additional information further comprise one or more instructions for causing the processing device to:
   determine authorization information for a user based upon the symbology; and
   transmit the authorization information to the remote computing device.

16. The system of claim 15, wherein the one or more instructions for causing the processing device to determine a level of access for a user viewing the additional information further comprise one or more instructions for causing the processing device to:
   receive an indication of a level of access the user has to the additional information based upon the transmitted authorization information; and
   provide appropriate access to the additional information based upon the indicated level of access as compared to the permission rights.

17. The system of claim 16, wherein appropriate access comprises at least one of viewing the additional information, adding to the additional information, removing at least a portion of the additional information, and editing at least a portion of the additional information.

18. The system of claim 14, wherein the at least one symbology comprises at least one of a text string, a barcode, a quick response code, a radio-frequency identification tag, and a near-field communication tag.

19. The system of claim 14, further comprising one or more instructions for causing the processing device to receive targeted advertising and display the targeted advertising on the display.

* * * * *